United States Patent
Cade

(10) Patent No.: US 9,231,467 B2
(45) Date of Patent: Jan. 5, 2016

(54) SYSTEM AND METHOD FOR MANAGING RECOVERY OF CONTROL IN AN ELECTRICAL SYSTEM

(71) Applicant: Control Techniques Limited, Newtown (GB)

(72) Inventor: Michael Cade, Newtown (GB)

(73) Assignee: CONTROL TECHNIQUES LIMITED, Newtown (GB)

( * ) Notice: Subject to any disclaimer, the term of this patent is extended or adjusted under 35 U.S.C. 154(b) by 197 days.

(21) Appl. No.: 13/920,729

(22) Filed: Jun. 18, 2013

(65) Prior Publication Data
US 2013/0343104 A1 Dec. 26, 2013

(30) Foreign Application Priority Data
Jun. 20, 2012 (GB) .................................. 1210974.0

(51) Int. Cl.
*H02M 1/36* (2007.01)
*H02J 3/38* (2006.01)

(52) U.S. Cl.
CPC ................. *H02M 1/36* (2013.01); *H02J 3/383* (2013.01); *Y02E 10/563* (2013.01)

(58) Field of Classification Search
None
See application file for complete search history.

(56) References Cited

U.S. PATENT DOCUMENTS

| | | | |
|---|---|---|---|
| 5,136,494 A * | 8/1992 | Akagi et al. | 363/34 |
| 6,629,064 B1 * | 9/2003 | Wall | 702/191 |
| 7,026,774 B2 * | 4/2006 | Inaba et al. | 318/400.33 |
| 7,952,214 B2 | 5/2011 | Ichinose et al. | |
| 8,014,181 B2 * | 9/2011 | Tan et al. | 363/74 |
| 8,378,515 B2 | 2/2013 | Fortmann | |
| 2003/0218887 A1 * | 11/2003 | Kojori et al. | 363/16 |
| 2008/0143315 A1 * | 6/2008 | Bickel | 324/76.12 |
| 2010/0085784 A1 * | 4/2010 | Chou et al. | 363/45 |
| 2012/0147637 A1 | 6/2012 | Petter | |
| 2012/0205981 A1 * | 8/2012 | Varma et al. | 307/64 |

* cited by examiner

*Primary Examiner* — Emily P Pham
(74) *Attorney, Agent, or Firm* — Harness, Dickey & Pierce, P.L.C.

(57) ABSTRACT

A method of managing recovery from an event in an electrical circuit leading to a loss of control of an inverter in the electrical circuit is disclosed, the method comprising sampling a parameter of operation before the event, monitoring for occurrence of the event, calculating an estimated value of the parameter at a time after the event based on an extrapolation of the monitored parameter and controlling the inverter using the estimated value of the parameter.

20 Claims, 5 Drawing Sheets

SYSTEM AND METHOD FOR MANAGING RECOVERY OF CONTROL IN AN ELECTRICAL SYSTEM

CROSS-REFERENCE TO RELATED APPLICATION

This application claims the benefit and priority of Great Britain Patent Application No. 1210974.0 filed Jun. 20, 2012. The entire disclosure of the above application is incorporated herein by reference.

FIELD

This invention relates to a method and system for managing recovery of control in an electrical system. The invention is particularly, though not exclusively, applicable to an inverter and a method and system for recovery of control in the event of an electrical transient in a renewable energy system.

BACKGROUND

An inverter is a form of converter of electrical energy. For example, the inverter can be arranged as part of a system for controlling the flow of power between a d.c. power supply and an a.c. power system. An inverter will typically comprise a bank of power switching devices, such as insulated gate bipolar transistors (IGBT's) and their anti-parallel diodes. The inverter is controlled by a microprocessor-based control unit which implements a control algorithm for the inverter. For example, power supplied from photovoltaic (PV) panels is fed to an a.c. power system such as an electrical grid network through an inverter that converts the d.c. output of the PV panels into a.c. power for the grid. In a particular application where the d.c. connections of an additional inverter supplying a motor are connected to create a drive that allows bidirectional power flow.

Inductors are arranged between the inverter phase outputs and the a.c. power system to limit the harmonic currents that would be created due to the switching operation of the inverter. An additional switching frequency filter is often present as well to limit the harmonic voltage distortion to an acceptable level at the point of connection with the a.c. power network.

Transient voltage changes can occur in an a.c. power system for various reasons, such as faults or the sudden connection of addition of equipment to the system. The inductors serve to limit the resulting transient current flowing between the a.c. power system and the inverter. An over-current protection system is usually provided to disable the switching devices in the inverter if the current flowing through the inverter exceeds a specific level above which the inverter may be damaged. A sufficiently large voltage transient in the a.c. power system may produce a current transient that is large enough to trigger the over-current protection system. However, disabling an inverter is seen as a last resort due to the time taken for the inverter to resynchronise itself to the supply and then undergo a restart procedure. It is not usually practicable to significantly increase the control bandwidth of the inverter control system to limit current transients so that the over-current trip is not activated with all possible voltage transients, and so the method conventionally used to ensure that the inverter remains active during a voltage transient in the a.c. supply is to increase the inductance between the a.c. supply and the inverter. In this way the transient current between the a.c. supply and the inverter can be limited, even with the worst case supply voltage transient, so that the over-current protection system is not activated except in the most severe of circumstances, such as a fault within the inverter system. Nevertheless, the impedance required to achieve this is larger than would be required for normal inverter operation. Large inductances are both bulky and expensive, and to be avoided if at all possible.

SUMMARY

An invention is set out in the claims.

A method of managing recovery from an event in an electrical circuit leading to a loss of control of an inverter in the electrical circuit, the method comprising: sampling a parameter of operation before the event; monitoring for occurrence of the event; calculating an estimated value of the parameter at a time after the event based on an extrapolation of the monitored parameter; and controlling the inverter using the estimated value of the parameter.

There is also disclosed a system for managing recovery from an event in an electrical circuit leading to a loss of control of an inverter in the electrical circuit, the system comprising: means for sampling a parameter of operation before the event; means monitoring for occurrence of the event; means for calculating an estimated value of the parameter at a time after the event based on an extrapolation of the monitored parameter; and means for controlling the inverter using the estimated value of the parameter.

The monitored event may be a transient in the current in the circuit which is sufficient to trigger the over-current protection system. It has been recognised by the inventor that disabling an inverter temporarily is not necessarily a bad thing as long as the negative consequences of the disablement (e.g. downtime) can be addressed. While certain regulatory bodies permit an inverter system to trip out in normal operation, the disablement should be limited to a short period, such as 20 ms. Hence the preferred option has in the past been to avoid disabling the inverter by the use of large inductors.

The parameter may be sampled and stored for multiple sample periods before the event.

The estimated value of the parameter may be based on the parameter from one or more sample periods.

In the particular form the sampled parameter is related to the phase angle of the alternating supply voltages of the circuit. In this case the estimated value of the parameter may be derived from an estimate of a reference frame angle controlling a three phase alternating current from the inverter. For example, the parameter in a first sample period may be used to produce the estimated value as an angle of the voltages, and the parameter in a second sample period used with the parameter from the first sample period to derive an estimate of the frequency of the voltages for synchronising the control of the inverter to the supply.

In a particular application the circuit may comprise a d.c. source connected to one side of the inverter, for example a renewable energy source such as a photovoltaic array. The circuit may further comprise an additional inverter connected to a motor to create a drive that allows bi-directional power flow with the a.c. supply.

In order to minimise the effect of possible transients in the resumption of control of the inverter the voltage demand to the inverter coincident with the estimated value of the parameter can be set at a non-zero value less than the voltage before the event, for example half the voltage before the event, thereby limiting the effect of any mismatch the voltage at resumption.

The disclosed embodiments enable the use of inductors for normal inverter operation in an inverter power system by enabling the system to be restored to normal operation from a fault condition more quickly by having monitored the supply conditions before the disablement is required and using this information after the inverter has been disabled to predict the operating conditions that will prevail when the inverter is restarted. This saves time in the restart process. Thus, temporarily shutting down the inverter when an a.c. supply transient occurs can be accommodated within the operating function of the control system.

DRAWINGS

Embodiments will now be described by way of example with reference to the accompanying drawings in which.

DETAILED DESCRIPTION

Figure 1:
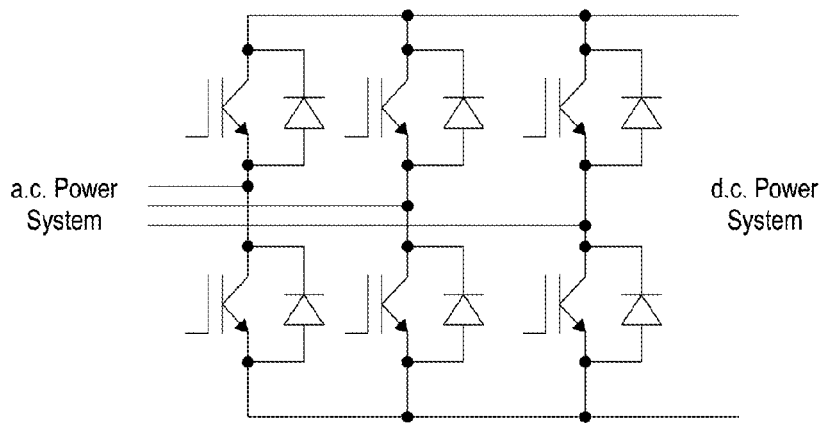
FIG. 1 illustrates an inverter.
Figure 2:
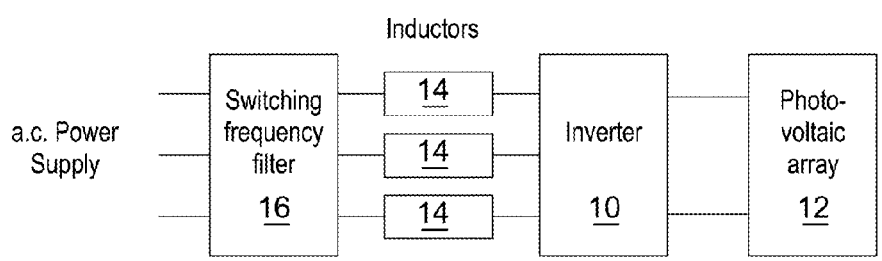
FIG. 2 illustrates an inverter system.

FIG. 1 is a typical arrangement of IGBT switching devices and anti-parallel diodes in an inverter. FIG. 2 is a typical arrangement of an inverter 10 used to connect a d.c. power source, such as a PV array 12, connected to an a.c. power system, such as a grid network. The three phase a.c. side of the inverter is connected to the a.c. power system through an inductor 14 in each phase and a switching frequency filter 16.

Figure 3:
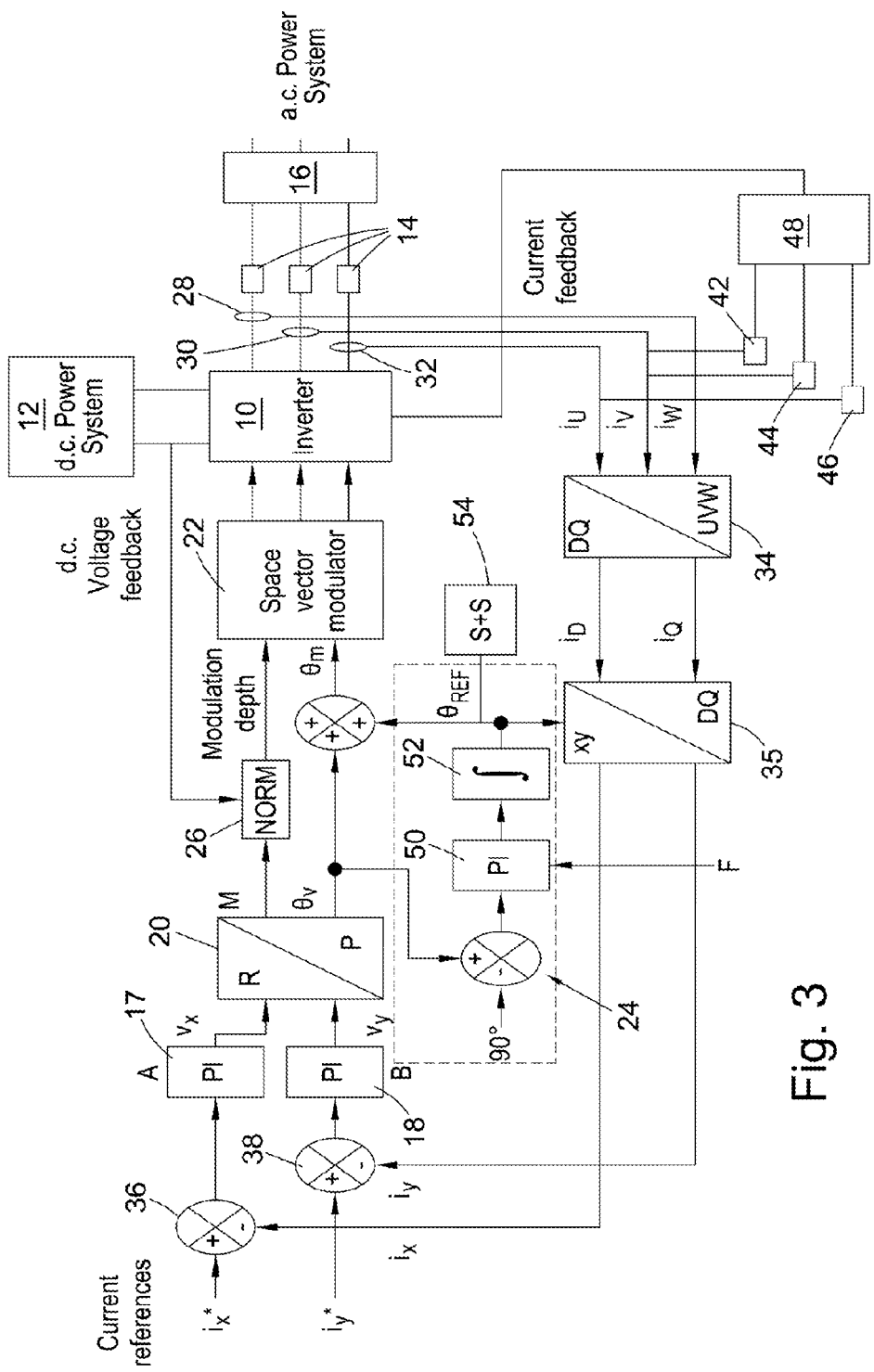
FIG. 3 illustrates a reference frame based current controller for an inverter system.

FIG. 3 illustrates a system for controlling the currents and providing over-current protection in an electrical system such as that illustrated in FIG. 2. The system is typically implemented with digital electronics including a microprocessor programmed to implement a suitable control strategy. The implementation of the disclosed embodiments is described in terms of functional block diagrams of the digital electronics and controlling software provided by the microprocessor. In this particular example the control strategy is based on PI controllers. Other control algorithms are also utilisable. The disclosed methods and systems can be implemented in other hardware control systems.

The system comprises an inverter 10 providing a three phase output through the inductors 14 and filter 16. The system is based on PI functions 17/18 providing orthogonal d.c. voltage signal components $V_x$ and $V_y$ to a rectangular-to-polar converter 20 having an output of voltage magnitude V and voltage angle $\theta_v$. The normalised voltage signal is then used as one input to a space vector modulator (SVM) 22 which implements an algorithm for control of the inverter to create a three-phase a.c. output. The other input to the SVM 22 is a modulation angle signal $\theta_m$. The system also comprises a phase locked loop (PLL) 24 which defines the reference frame angle, and in the steady state ties the voltage angle signal $\theta_v$ to the y axis of the controller reference frame by a imposing a 90° displacement between the required voltage vector and the reference frame. The reference frame angle $\theta_{REF}$ is summed with the voltage angle signal $\theta_v$ to produce the modulation angle $\theta_m$. To ensure that the current controllers have consistent loop gains for different levels of d.c. voltage on the inverter terminals the voltage magnitude V is normalised with d.c. voltage level in normaliser 26 to give the modulation depth m for the SVM. The output of the SVM 22 is a set of control signals for the switching devices in each of the three phases of the inverter 10. The function of the PLL 24 is well known to the skilled person. A full description of its function in the context of a voltage source pulse width modulated converter can be found in the paper "PWM rectifier using indirect voltage sensing" by P. Barrass and M. Cade, IEE Proc. Part B—Electrical Power Applications., Vol. 146, No. 5, September 1999, the entirety of which is incorporated herein by reference.

Signals indicative of the three phase a.c. currents $i_u$, $i_v$, $i_w$ at the a.c. side of the inverter are produced by current transducers 28-32 and are fed back to a three phase/two phase converter 34 to produce two phase current signals $i_D$ and $i_Q$, which are in turn transformed in transformer 35 into current components $i_x$ and $i_y$ in the reference frame defined by the reference frame angle $\theta_{REF}$. The current feedback signals of $i_x$ and $i_y$ are compared with the corresponding current demand signals $i_x^*$ and $i_y^*$ in comparators 36 and 38 and the difference signals are supplied to the PI functions 17/18. Hence the system is designed to produce current components $i_x$ and $i_y$ to follow the reference values of current $i_x^*$ and $i_y^*$.

The PI functions 17/18 include proportional and integral components. The integral components are more suited to the steady state control of the currents, whereas the proportional components provide transient control. In addition, the current transient limiting effect of the inductors between the a.c. power system and the inverter 10 is supplemented by the proportional components of the PI functions. The higher the gain of the proportional functions, the smaller the resulting current transient produced as a result of voltage transients in the a.c. power system. The inverter 10 has an over-current disabling system which is not reliant on the control system processor for operation. The disabling over-current protection system comprises threshold detectors 42-46 which monitor the current signals $i_u$, $i_v$, $i_w$ from the transducers 28-32. In the event that a current in one or more of the phases reaches a threshold that is of a magnitude (either positive or negative) just below that which would damage the inverter, one or more of the detectors sends a signal to control logic 48 that rapidly disables the switching devices of the inverter to a non-conducting state.

If disabling of the inverter according to previous practice is to be avoided then the combination of the inductors between the a.c. supply and the inverter, and the proportional gains of the PI functions, have to be such that any voltage transient could not cause the current to reach the threshold level set in the control logic 48. In a known system this is compromised for two reasons. Firstly, there is a limit on the maximum gain of the proportional components above which the current control system will become unstable. The maximum gain is usually limited to a level by the presence of the switching frequency filter 14. Secondly, for a given level of proportional gain the current transient could be limited by using a large inductance between the a.c. power system and the inverter. However, as explained this cannot be achieved without increasing the inductance to a value that is significantly larger than that normally required to limit the current harmonics due to the inverter switching action. Increasing the inductance to the required level is not commercially acceptable.

It has been found that shutting down the inverter may be part of an acceptable solution to managing recovery from a transient or other event potentially damaging to the control system, and there are applications where it would be acceptable for the inverter actually to be disabled for a short period, provided it begins to operate again within this period. One example is in renewable energy applications, such as the PV application already mentioned. Typically, it can be a requirement that within 20 ms of a fault occurring in the a.c. power system that causes the a.c. voltage to fall to a low level, the inverter must deliver controlled active and reactive current again. According to the disclosed embodiments herein, the inverter over-current protection system is arranged to disable the inverter when a significant voltage transient occurs, but the system recovers within the required amount of time to enable both active and reactive current to be delivered even if the a.c. power system voltage is close to zero immediately after the fault.

It is desirable that the control system ensures that the required fundamental levels of active and reactive current flow between the a.c. power system and the inverter. To do this the instantaneous phase of the a.c. power system voltages is used to provide the reference frame angle $\theta_{REF}$. The value of the voltage angle $\theta_v$ is compared in the PLL 24 with 90° so that it will be 90° in normal operation. Hence the supply voltage is aligned with the y axis of the reference frame. The PLL 24 includes a PI function 50 giving an output of the required reference frame frequency $F_{REF}$, and this output is integrated by integrator 52 to produce the reference frame angle $\theta_{REF}$. If the supply voltage is at or close to zero, or the inverter has been disabled because of an over-current event, the phase of the a.c. power system voltages cannot be obtained. However, the instantaneous phase and the steady state frequency of the a.c. power system voltages are available before the voltage transient occurred. This information can be extrapolated to estimate the phase angle of the a.c. power system voltages present after the fault, so that the correct active and reactive power can be delivered to the a.c. power system while the voltages are too low to be used to obtain the refrence frame angle $\theta_{REF}$.

Operation of the circuit of FIG. 3 according to one form is as follows.

Figure 4:
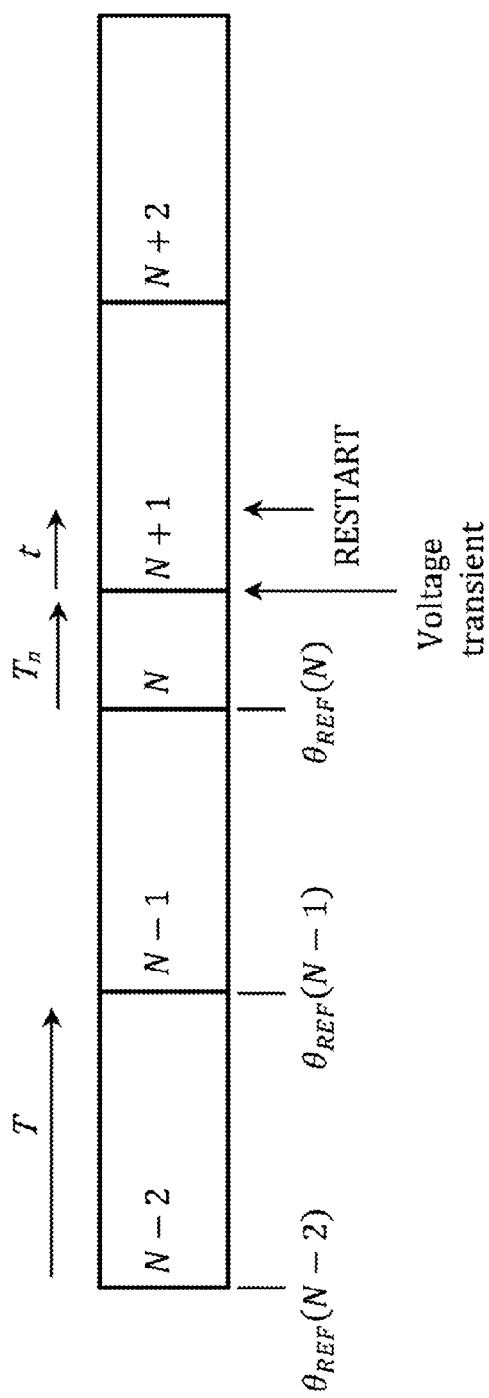
FIG. 4 illustrates a frame reference extrapolation time line.

Before the transient—in addition to the functions of the control system, the reference frame angle $\theta_{REF}$ is sampled and stored by sample and store function 54 at a sample rate slower than that of the control system (e.g. once every second) to be used after the voltage transient to extrapolate the reference frame angle for the control system. The sampling system before, during and after a voltage transient is shown in FIG. 4. It will be seen that the information available in the sample N is corrupted as a result of the voltage transient.

Immediately after the transient at time t, if the over-current system 48 becomes active due to the detection of a current transient in one of the phases then the inverter 10 is disabled. For a short period the current that was flowing in the inductors will decay via the anti-parallel diodes in the inverter. There will be no net power flow through the inverter during this period and the reference frame angle $\theta_{REF}$ can no longer be obtained by monitoring the voltage angle $\theta_v$.

Therefore, it is necessary to derive a value for the reference frame angle $\theta_{REF}$ that is not available after N due to the voltage transient at time t. The integrator 52 that normally provides the reference frame angle $\theta_{REF}$ is set up after the event at time t based on information taken before the voltage transient and is loaded with $\theta_{REF}(N-2)+([\theta_{REF}(N-2)-\theta_{REF}(N-1)]\times(2T+T_N+t)/T)$, where t is the time since the voltage transient. This has used the available uncorrupted information to estimate the present reference frame angle that would still be substantially synchronised to the angle of the a.c. power system voltages assuming that the a.c. power system frequency has not changed significantly. Because the data used was obtained at least one sample period (T) before the voltage transient occurred, it is unaffected by the transient itself. From this point onwards the integrator 52 is fed with a derived value that will cause the estimated reference frame angle to continue to follow the angle of the a.c. power system voltages based on the change of reference frame angle between $\theta_{REF}(N-2)$ and $\theta_{REF}(N-1)$ again avoiding any data that could be affected by the voltage transient.

Figure 5:
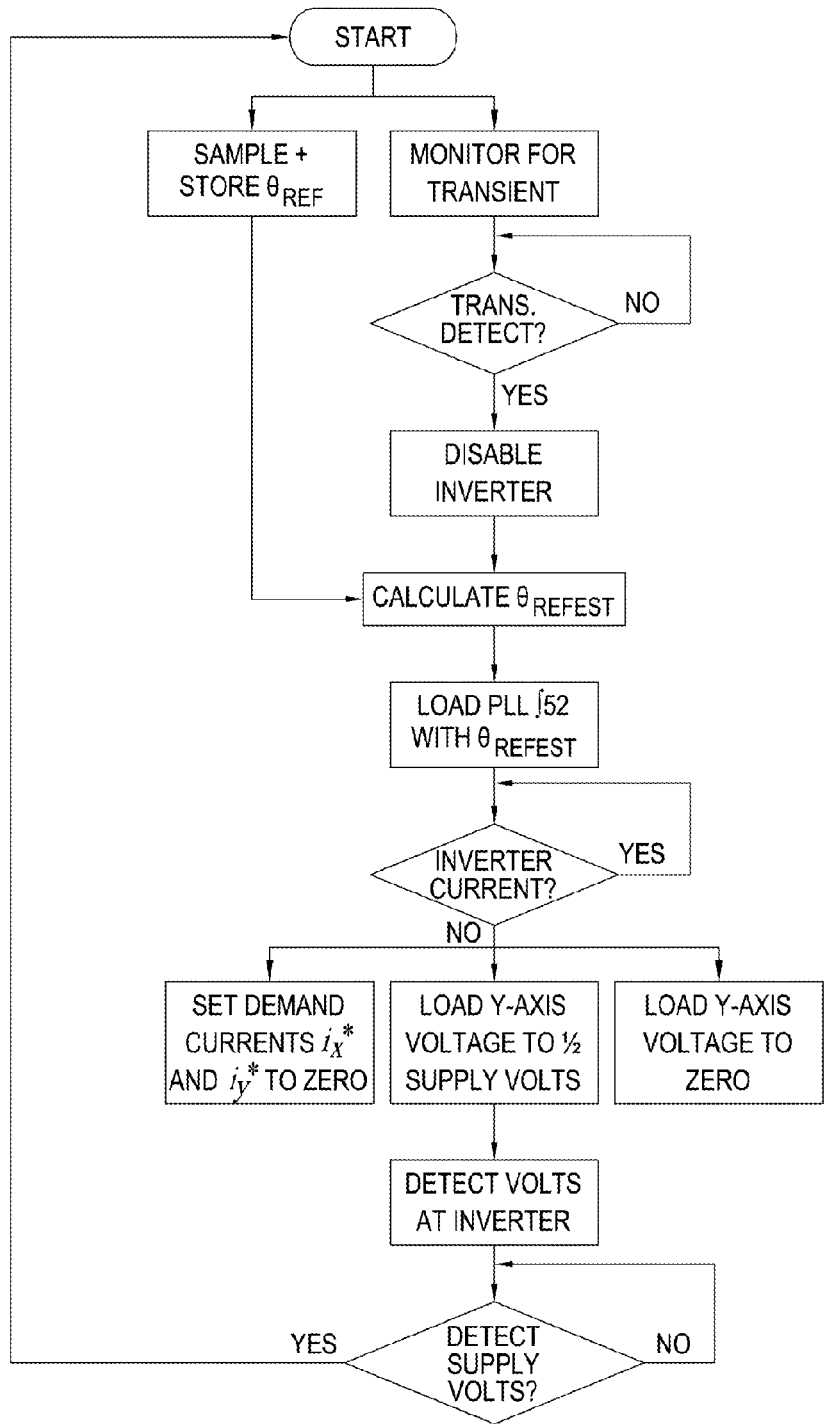
FIG. 5 is a flow chart of the operation of part of the disclosed embodiment.
Figure 6:
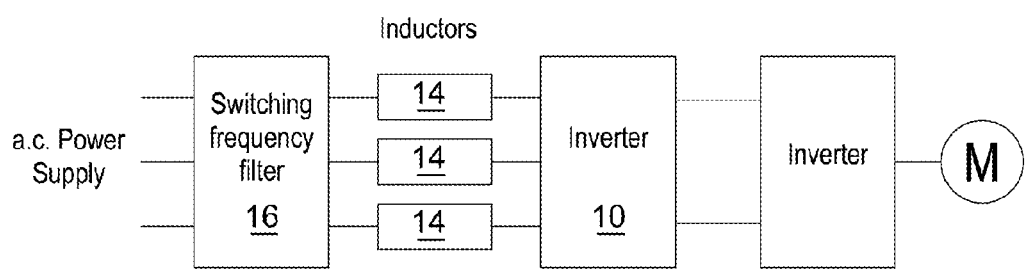
FIG. 6 illustrates an inverter system including a motor and two inverters. One of the inverters supplying the motor is connected to the other inverter.

Having derived an estimate of the value for $\theta_{REF}$ and when the current in the inductors has decayed due to being disabled, the inverter is re-enabled and in this embodiment the values for the current references $i_x^*$ and $i_y^*$ are set to zero. At this point the a.c. power system voltages are unknown. Any attempt to impose arbitrary values of voltages could result in a further voltage transient of an unacceptable magnitude. To minimise the consequent transient current that could occur due to a mismatch between the inverter voltages and the a.c. power system voltages when the inverter is re-enabled, the integrators in the current PI functions 17/18 are preset to a value equivalent to half the level likely to be present during normal operation. This value can be derived from the previous values based on monitoring previous power system activity. As the y component of the reference frame is normally aligned with the voltage vector produced by the a.c. power system voltages, the integrator for the y axis PI function 18 is set to half the likely supply voltage and the integrator for the x axis PI function 17 is set to zero. If this operation is successful then a short time later the inverter will be active and matching the a.c. power system voltages due to the control function based on the PI functions and so a minimal fundamental current will be flowing between the inverter and the a.c. power system. This form of the procedure is set out in the flow chart of FIG. 5.

The re-established current is detected in the transducers 28-32 and passed to the processor of the system. The current references can now be adjusted to demand the required amount of active and reactive current flow $i_x$ and $i_y$ between the a.c. power system and the inverter. The level of active power may be limited if the a.c. power system voltages are low otherwise excessive current will then be required to deliver any significant amount of power.

Finally, the system reverts to normal reference frame measurement operation. Once the inverter is active again, the phase angle of the a.c. power system voltages can be obtained again by monitoring the voltage angle $\theta_v$ at the output of the current PI functions 17/18. This information can only be considered to be reliable if the a.c. power system voltages are reasonably balanced (ie. the three phase voltages are substantially equal) and above a defined threshold where the supply voltages are large enough to give reliable phase information. If the information is considered acceptable, the reference frame angle is obtained under the normal control conditions and the reference frame angle is again sampled at sample rate T to be used in the event of a subsequent voltage transient.

If a voltage transient occurs in the system that does not cause the over-current protection system 48 to become active and the a.c. power system voltages remain above the level where the reference frame angle $\theta_{REF}$ can be obtained by monitoring the voltage angle $\theta_v$ then the above protection system is not used. However, if the over-current protection system does not become active, but the a.c. power system voltages are considered too low to be used to obtain the reference frame angle, then the reference frame angle information obtained before the voltage became too low can be used in a similar way to extrapolate the reference frame angle until the voltage is recovered sufficiently to be used again. Thus, the disclosed embodiments are applicable to situations where an inverter has been disabled and also when the voltage is insufficient to derive values for reliable control of the power.

The disclosed embodiments are applicable to the control of an electrical system such as the delivery of electrical power from a renewable energy source, such as a PV array, to an electrical power network.

The invention claimed is:

1. A method of managing recovery from an event in an electrical circuit leading to a loss of control of an inverter in the electrical circuit, the method comprising:
    sampling a parameter of operation before the event;
    monitoring for an occurrence of the event;
    disabling the inverter in response to the occurrence of the event;
    calculating an estimated value of the parameter at a time after the event based on an extrapolation of the parameter;
    controlling the inverter using the estimated value of the parameter; and
    re-enabling the inverter using the estimated value of the parameter.

2. The method as claimed in claim 1 in which the event is a transient in a current in the electrical circuit.

3. The method as claimed in claim 1 in which the parameter is sampled and stored for multiple sample periods before the event.

4. The method as claimed in claim 3 in which the estimated value of the parameter is based on the parameter from one or more sample periods.

5. The method as claimed in claim 1 in which the parameter is related to a phase angle of alternating supply voltages of the electrical circuit.

6. The method as claimed in claim 5 in which the estimated value of the parameter is derived from an estimate of a reference frame angle controlling a three phase alternating current from the inverter.

7. The method as claimed in claim 6 in which the parameter in a first sample period is used to produce the estimated value as an angle of the alternating supply voltages, and the parameter in a second sample period is used with the parameter from the first sample period to derive an estimate of a frequency of the alternating supply voltages for synchronizing the control of the inverter to the alternating supply voltages.

8. The method as claimed in claim 1 in which the electrical circuit comprises a d.c. source connected to one side of the inverter, for example a renewable energy source such as a photovoltaic array.

9. The method as claimed in claim 1 in which the electrical circuit comprises an additional inverter supplying a motor is connected to another side of the inverter.

10. The method as claimed in claim 1 in which a voltage demand to the inverter coincident with the estimated value of the parameter is set at a non-zero value less than a voltage before the event, for example half the voltage before the event.

11. A system for managing recovery from an event in an electrical circuit leading to a loss of control of an inverter in the electrical circuit, the system comprising:
    means for sampling a parameter of operation before the event;
    an overcurrent disabling system for monitoring for an occurrence of the event;
    means for disabling the inverter in response to the occurrence of the event;
    means for calculating an estimated value of the parameter at a time after the event based on an extrapolation of the parameter; and
    a space vector modulator for controlling the inverter using the estimated value of the parameter and for re-enabling the inverter using the estimated value of the parameter.

12. The system as claimed in claim 11 in which the event is a transient in a current in the electrical circuit.

13. The system as claimed in claim 11 in which the means for sampling are operable to sample the parameter and stored it for multiple sample periods before the event.

14. The system as claimed in claim 13 in which the means for calculating are operable to estimate the estimated value of the parameter based on the parameter from one or more sample periods.

15. The system as claimed in claim 11 in which the parameter is related to a phase angle of alternating supply voltages of the electrical circuit.

16. The system as claimed in claim 15 in which the estimated value of the parameter is derived from an estimate of a reference frame angle controlling a three phase alternating current from the inverter.

17. The system as claimed in claim 16 in which the means for calculating are operable to use the parameter in a first sample period to produce the estimated value as an angle of the alternating supply voltages, and use the parameter in a second sample period with the parameter from the first sample period to derive an estimate of the frequency of the alternating supply voltages for synchronizing control of the inverter to the alternating supply voltages.

18. The system as claimed in claim 11 in which the electrical circuit comprises a d.c. source connected to one side of the inverter, for example a renewable energy source such as a photovoltaic array.

19. The system as claimed in claim 11 in which the electrical circuit comprises an additional inverter supplying a motor connected to another side of the inverter.

20. The system as claimed in claim 11 in which a voltage demand to the inverter coincident with the estimated value of the parameter is set at a non-zero value less than a voltage before the event, for example half the voltage before the event.

* * * * *

UNITED STATES PATENT AND TRADEMARK OFFICE
CERTIFICATE OF CORRECTION

| | |
|---|---|
| PATENT NO. | : 9,231,467 B2 |
| APPLICATION NO. | : 13/920729 |
| DATED | : January 5, 2016 |
| INVENTOR(S) | : Michael Cade |

It is certified that error appears in the above-identified patent and that said Letters Patent is hereby corrected as shown below:

Specification

In column 4, line 55, please replace "14" with "16."

In column 5, line 35, please replace "refrence" with "reference."

Signed and Sealed this
Nineteenth Day of July, 2016

Michelle K. Lee
*Director of the United States Patent and Trademark Office*